US010029521B2

(12) United States Patent
Corghi

(10) Patent No.: US 10,029,521 B2
(45) Date of Patent: *Jul. 24, 2018

(54) MACHINE AND METHOD FOR FITTING AND REMOVING A TYRE

(71) Applicant: CORGHI S.p.A., Correggio (Reggio Emilia) (IT)

(72) Inventor: Giulio Corghi, Correggio (IT)

(73) Assignee: NEXION S.p.A., Correggio (RE) (IT)

( * ) Notice: Subject to any disclaimer, the term of this patent is extended or adjusted under 35 U.S.C. 154(b) by 134 days.

This patent is subject to a terminal disclaimer.

(21) Appl. No.: 14/789,620

(22) Filed: Jul. 1, 2015

(65) Prior Publication Data

US 2016/0001617 A1    Jan. 7, 2016

(30) Foreign Application Priority Data

Jul. 3, 2014 (IT) .............................. BO2014A0374

(51) Int. Cl.
*B60C 25/138*    (2006.01)
*B60C 25/05*    (2006.01)

(52) U.S. Cl.
CPC .......... *B60C 25/138* (2013.01); *B60C 25/059* (2013.01); *B60C 25/0512* (2013.01); *B60C 25/0593* (2013.01)

(58) Field of Classification Search
CPC .............. B60C 25/059; B60C 25/0512; B60C 25/0593; B60C 25/138
USPC ....................................................... 157/1.24
See application file for complete search history.

(56) References Cited

U.S. PATENT DOCUMENTS

| 4,047,553 | A | 9/1977 | Kotila | |
|---|---|---|---|---|
| 8,051,889 | B2 * | 11/2011 | Ferrari | B60C 25/138 157/1.24 |
| 8,783,326 | B1 * | 7/2014 | Vaninger | B60C 25/0551 157/1.17 |
| 8,985,178 | B1 * | 3/2015 | Vaninger | B60C 25/056 157/1.1 |
| 9,662,946 | B2 * | 5/2017 | Corghi | B60C 25/138 |

(Continued)

FOREIGN PATENT DOCUMENTS

| CN | 101224696 | 7/2008 |
|---|---|---|
| CN | 102555702 | 7/2012 |
| CN | 102632778 | 8/2012 |

(Continued)

OTHER PUBLICATIONS

Search Report dated Mar. 5, 2015 for corresponding Italian Patent Application No. BO20140374.

(Continued)

*Primary Examiner* — Hadi Shakeri
(74) *Attorney, Agent, or Firm* — Wegman, Hessler & Vanderburg

(57) ABSTRACT

Described is a machine (1) for fitting and removing a tire (2) from a corresponding rim (3) of a wheel (4) of a vehicle, comprising: a wheel-holder unit (6) rotating about a first axis (A); a column (8); an upper operating head (16), provided with at least one upper fitting tool (18), at least one further tool, angularly spaced from the upper fitting tool (18), by a predetermined angle, and a wall pressing tool (21) that can be placed in a working position which is operatively in contact with the wheel simultaneously with the upper fitting tool (18).

12 Claims, 6 Drawing Sheets

(56) References Cited

U.S. PATENT DOCUMENTS

2016/0001618 A1* 1/2016 Corghi .................. B60C 25/138
29/894.31

FOREIGN PATENT DOCUMENTS

| EP | 1 479 539 | 11/2004 |
| EP | 1 743 782 | 1/2007 |
| EP | 1 946 946 | 7/2008 |
| EP | 2 125 394 | 12/2009 |
| EP | 1 479 539 | 6/2010 |
| EP | 2 125 394 | 3/2011 |
| EP | 2 468 541 | 6/2012 |
| EP | 2 484 541 | 8/2012 |
| EP | 2 629 992 | 2/2015 |
| WO | 2008/081235 | 7/2008 |

OTHER PUBLICATIONS

First Office Action for corresponding Chinese Application No. 201510383537.5 dated Jul. 3, 2017 (English translation).
First Office Action for corresponding Chinese patent application No. 201510383529.0 dated Jul. 3, 2017.

* cited by examiner

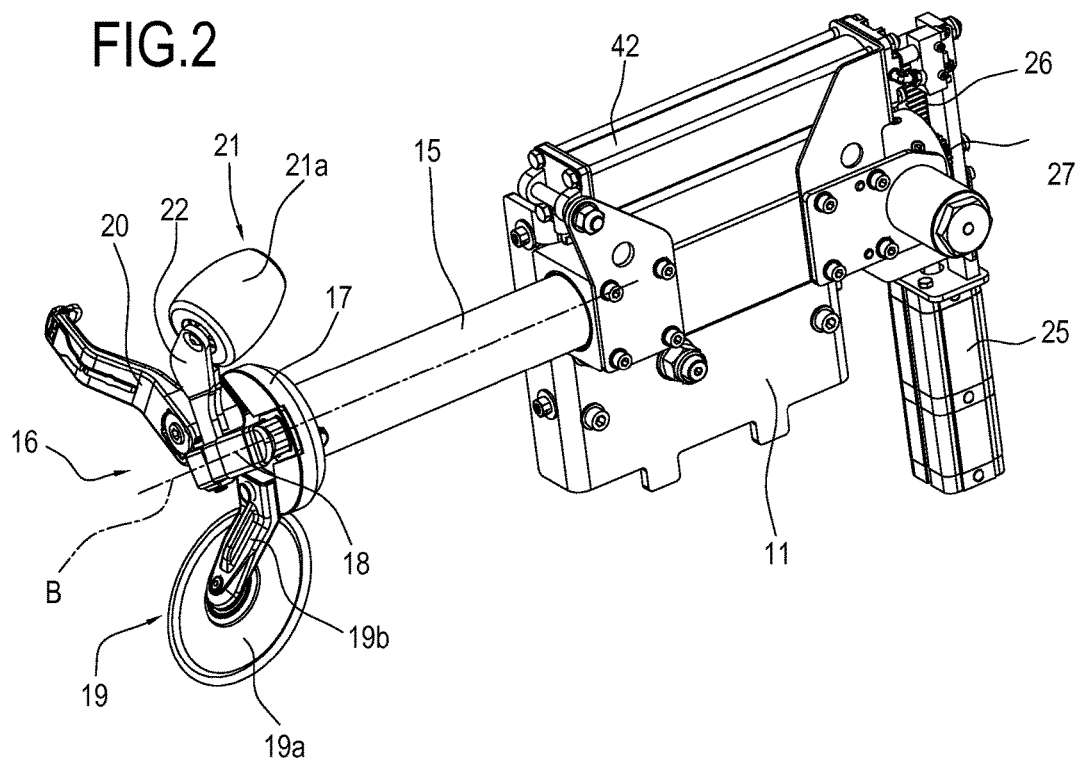
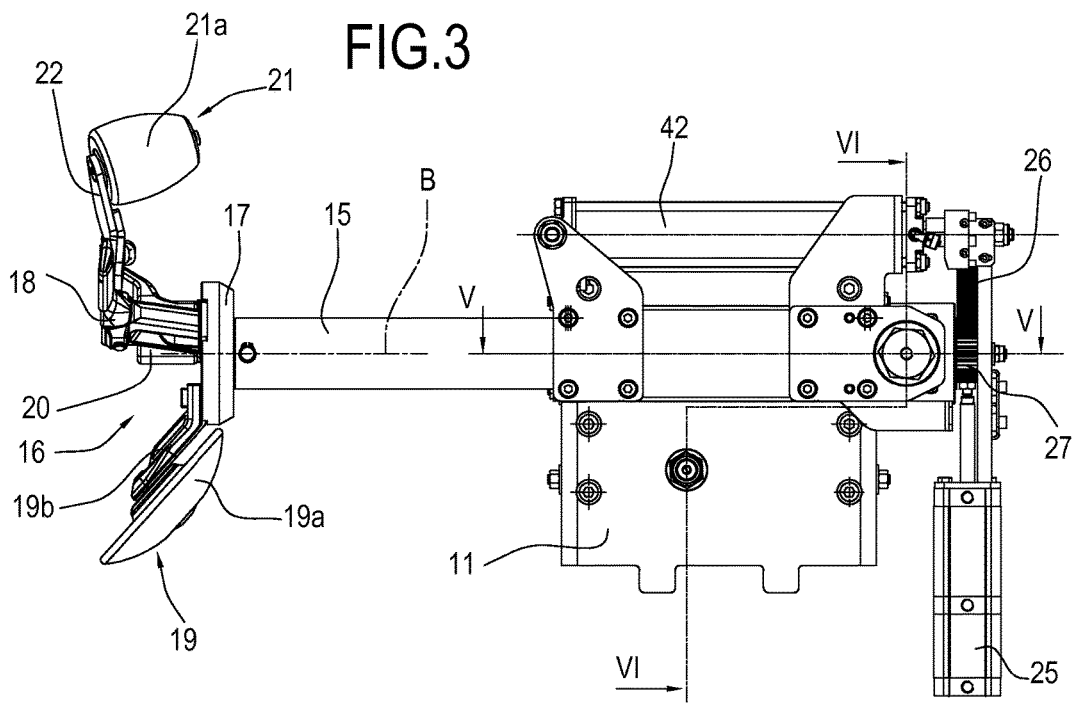

MACHINE AND METHOD FOR FITTING AND REMOVING A TYRE

BACKGROUND OF THE INVENTION

This invention relates to a machine and a method for fitting and removing a tyre.

To perform the removal of a tyre from a rim and the subsequent fitting operation, the state of the art consists of tyre changer machines having a wheel-holder unit and at least one operating unit.

The wheel-holder unit is designed to support and rotate the wheel about an axis. The operating unit comprises the tools used in different operating steps which entail:

- detaching the bead of the tyre from the annular end (that is, edge) of the rim (process also known as bead breaking);
- removing the tyre from the rim, that is, removing the tyre from the housing defined by the space between the two annular edges of the rim;
- fitting a new tyre on the rim, that is, positioning a new tyre in the housing.

It should be noted that the expression "tyre changer machine" is commonly understood to refer to a machine which is able to both remove the tyre from the rim and then perform the fitting operation. It should also be noted that the term "bead" denotes the portion of the tyre running round the annular edge of the rim.

The wheel-holder unit comprises, for example, a locking system which fixes the wheel to a rotary supporting plate. Typically, the axis of rotation is vertical, even though it is preferable to adopt a solution with a horizontal axis if the machine is designed to operate on wheels of heavy vehicles.

The operating unit usually comprises at least one bead breaker tool (or bead breaker disc). During use, the rubber of the tyre bead overheats and the bead adheres to the rim due to a rubber vulcanization phenomena; it is therefore necessary to detach the bead from the edge of the rim before starting the removal step. During the bead breaking step, the wheel is rotated by the wheel-holder unit and the bead breaker tool exerts a pressure on the side wall of the tyre close to the bead causing detachment from the edge of the rim.

It should be noted that a tyre has two beads, corresponding to the two annular edges of the rim, so the tyre changer machines usually have a pair of bead breaker disks, each of which is designed to act on a corresponding bead of the tyre.

The rotary wheel-holder unit has a free end, to which the wheel is fixed, and an opposite end, connected to a drive unit. The positioning of the wheel on the wheel-holder unit makes it possible to define a lower side and a bead of the tyre, facing towards the end of the wheel-holder unit connected to the drive unit, and an upper side and a bead of the tyre, facing in the opposite direction to the lower side.

For this reason, the tools designed to act on the upper bead are referred to as upper tools, whilst the tools designed to act on the lower bead are referred to as lower tools.

In the tyre changer machines wherein the wheel-holder unit is configured with a vertical axis, the lower side and bead of the tyre face towards the supporting surface of the machine, that is to say, downwards, whilst the upper side and bead of the tyre face in the opposite direction relative to the lower side, that is to say, upwards.

The tyre changer machines are equipped with numerous tools, for bead breaking, removal and fitting of the tyre; typically, the tyre changer machines have tools designed to operate (in the bead breaking, removal and fitting steps) on the upper bead of the tyre and other, different, tools designed to operate (in the bead breaking, removal and fitting steps) on the lower bead of the tyre.

Each operating step requires the use of a specific tool or a specific combination of tools. In light of this, it should be noted that, typically, each tool is mounted on a respective supporting arm, actuated by a respective actuator and moved on a relative guide.

The presence of many movement apparatuses limits the vision of the operator in the proximity of the zone in which the machine operates on the wheel, hindering the freedom of movement of the operator.

This also translates into a significant increase in the dimensions of the tyre changer machines, which have a rather complex structure. The complexity of the machines increases the production and maintenance costs. Moreover, the increased complexity of these machines makes them more difficult to use by the operator to detriment of the reliability, thereby increasing the risks of error.

A partial solution to these problems is provided by patent document EP1479539, which has a machine having an operating head wherein a bead breaker disc is connected to a fitting/removal tool; this tyre changing tool is moved by a mechanism which allows it to change from one working position (that is, operational) to a non-interference position (that is, rest).

Patent document EP2125394 shows a machine having a rotary operating head with two tools; more specifically, the operating head has a bead breaker disc and a removal tool. The rotation of the head allows the selection of the tool. The same arm is connected to a fitting tool which, thanks to a hinge coupling, can be lowered or raised to adopt alternatively an operating position or a non-interference position.

Patent document EP1946946 shows a machine having a rotary operating head which supports three tools (a bead breaker tool, a removal tool and a fitting tool) arranged at 120°, in such a way as to be selectively and alternatively positionable in the operating position by rotating the operating head.

However, these tyre changer machines also have certain shortcomings, because they do not allow the tyre to be mounted in a particularly simple, reliable and comfortable fashion, with a particularly reduced number of actions by the tyre repair specialist.

SUMMARY OF THE INVENTION

The aim of this invention is to provide a machine and a method for fitting and removing a tyre which overcome the above mentioned drawbacks of the prior art.

More specifically, the aim of this invention is to provide a machine and a method for fitting and removing a tyre which is particularly simple and reliable. The greater simplicity of the machine results in a reduction in costs.

A further aim of this invention is to provide a tyre changer machine having particularly reduced dimensions, to give the tyre repair specialist a large space for operating and visibility.

A further aim of the invention is to provide a tyre changer machine that is particularly robust and reliable.

These aims are fully achieved by the machine and method forming the subject matter of this invention as characterised in the appended claims.

More specifically, the tyre changer machine according to the invention is designed to take out/insert a tyre from/in a housing defined by the annular edges of a rim.

The tyre changer machine comprises a wheel-holder unit and at least one operating unit. The wheel-holder unit is configured to rotate about a first axis of rotation, preferably vertical.

It should be noted that the adjectives "upper" and "lower" are used in this document for convenience of description, without thereby limiting to specific spatial references, which remain arbitrary. The adjectives "upper" and "lower" are used to distinguish different functions of machine parts, without limiting to absolute spatial references.

In the embodiment illustrated, the wheel-holder unit is connected to a base for being moved in a direction perpendicular to the relative axis of rotation, that is, in the direction away from or towards the operating unit.

In a possible embodiment of this invention, a column oriented vertically is coupled to the base of the tyre changer machine. The column is equipped with a guide on which two carriages, an upper carriage and a lower carriage, are slidably coupled. Preferably, the upper carriage and the lower carriage are coupled to the same guide, for reducing the dimensions of the tyre changer machine according to this invention.

The upper carriage supports an upper arm having two ends. The first end of the upper arm is coupled to the upper carriage in such a way that it can translate along and rotate about a second axis of rotation. The second end of the upper arm is connected to an upper operating head.

The lower carriage supports a lower arm having two ends. The first end of the lower arm is coupled to the lower carriage. The second end of the lower arm is connected to a lower operating head.

The upper operating head comprises an upper fitting tool, having a shape which is elongate in a direction for being operatively inserted between a bead of the tyre and an annular edge of the rim, and at least one further tool. Preferably, the further tool is an upper bead breaker disc or a removal tool, the latter having a shape which is elongate in a direction to be inserted between the bead of the tyre and the edge of the rim.

The tools of the upper operating head are angularly spaced from each other by a predetermined angle, to be selectively and alternatively positionable in an operating configuration by rotation of the upper operating head.

The tyre changer machine according to this invention comprises a wall pressing tool, connected to the upper operating head and oriented in a direction concordant with the upper fitting tool, for being positioned, in an operating position in contact with the wheel, simultaneously with the upper fitting tool.

This makes it possible to simultaneously select the upper fitting tool and the wall pressing tool by simply rotating the upper operating head, thereby reducing the complexity of the machine. Preferably, the positioning of the upper tools in the operating positions, in contact with the wheel, is made possible by a movement of the wheel-holder unit (by translating along a direction perpendicular to the axis of rotation of the wheel-holder unit) and/or by translating the upper arm in a direction parallel to the axis of rotation of the wheel-holder unit (using the upper carriage) and perpendicularly to the axis of rotation of the wheel-holder unit (by a movement of extension and withdrawal of the upper arm with respect to the upper carriage).

In effect, the upper fitting tool and the wall pressing tool dedicated to the working on the upper bead are connected to the same upper operating head and have a fixed spatial relationship.

It should be noted that, preferably, the upper fitting tool has an elongate shape; preferably, elongate along a longitudinal axis contained in a plane parallel to the axis of rotation of the wheel-holder unit and perpendicular to the axis of rotation of the upper operating head.

Moreover, preferably, the upper fitting tool has an end configured for coupling with the upper operating head and a free end (if necessary, shaped) to operate on the tyre. Preferably, the upper fitting tool, in its operating configuration, is oriented (elongate) along a longitudinal axis which is substantially parallel to the axis of rotation of the wheel-holder unit (that is to say, to the first vertical axis of rotation).

With regard to the spatial relationship between the upper fitting tool and the wall pressing tool connected to the upper operating head, attention is drawn to the following.

Preferably, the wall pressing tool is positioned laterally at a predetermined distance relative to a plane passing through the first vertical axis of rotation and through the upper fitting tool.

This ensures that, when the upper fitting tool and the wall pressing tool are operatively and simultaneously active on the tyre, the wall pressing tool presses on a zone of the tyre located laterally (angularly spaced by a predetermined quantity along a circumference defined by the bead of the tyre) relative to the zone in which the upper fitting tool is active. It should be noted that, in order to operate, the wall pressing tool must press on a portion of the tyre in which the bead has already been inserted inside the housing defined by the edges of the rim. Consequently, the position of the wall pressing tool relative to the upper fitting tool is determined by the direction of rotation of the wheel rotated by the wheel-holder unit.

Moreover, preferably, the distance of the wall pressing tool from the first vertical axis of rotation is greater than the distance at which the upper fitting tool is located.

This ensures that, when the upper fitting tool and the wall pressing tool are operatively and simultaneously active on the tyre, the wall pressing tool presses on a zone of the side of the tyre, whilst the upper fitting tool acts on the bead of the same tyre.

Moreover, preferably, the wall pressing tool is positioned at a greater distance from the upper operating head than the upper fitting tool, in the direction of the first axis of rotation of the wheel-holder unit (that is, of the longitudinal axis of the upper fitting tool). This facilitates a pushing action on the side of the tyre when the upper fitting tool is positioned for operating between bead and edge of the rim.

It should also be noted that the solution proposed by this invention increases the reliability of the machine, since it reduces the possibility of error by the operator by limiting the number of operations the operator needs to perform, for example, the manual positioning of the wall pressing tool in its operating position.

The wall pressing tool comprises a contact element configured to rotate about its axis of rotation when, in the operating position, the side of the wheel is pressed. Preferably, the contact element has an ogival shape in order to better adapt to the side of different types of tyres; however, this does not exclude any use of a contact element having a disc shape, that is to say, a shape similar to that typically used for the bead breaker discs.

Preferably, the wall pressing tool is connected to the upper fitting tool; preferably, the wall pressing tool is connected to the upper fitting tool in a rigid fashion. According to this invention, the connection is made using a connecting arm; preferably, the connecting arm is fixed to the upper fitting tool in an intermediate zone between the portion configured for the connection with the upper operating head and the portion configured to operate on the tyre. The embodiment illustrated limits the length of the connecting arm, thus reducing the intensity of the stress to which it is subjected in an operating step, thus increasing the useful life.

In an embodiment, the upper operating head of the tyre changer machine comprises, in addition to the upper fitting tool coupled with the wall pressing tool, two further tools, that is, an upper bead breaker disc and a removal tool. The tools fixed to the upper operating head are angularly spaced from each other by a predetermined angle, to be selectively and alternatively selectable in an operating configuration by rotation of the upper operating head.

The particular embodiment therefore defines three operating configurations:
  a first operating configuration wherein the upper bead breaker disc is oriented towards the upper side of the tyre;
  a second operating configuration wherein the removal tool is oriented towards the upper side of the tyre;
  a third operating configuration wherein the upper fitting tool and the wall pressing tool connected to it are simultaneously oriented towards the upper side of the tyre.

It should be noted that, according to this invention, there is at least one operating configuration wherein two tools can be selected simultaneously, that is, the upper fitting tool and the wall pressing tool.

It should be noted that the angular distance which separates the tools mounted on the operating head allows the tool operating on the wheel not to interfere with the inactive tools. It should be noted that this solution allows the grouping together, on the upper operating head, of all the tools configured to operate in a stationary position relative to the wheel rotated by the wheel-holder unit and designed to work on the side wall and on the upper bead of the tyre during the tyre fitting and removal steps. It should be noted that the tools can be selected by rotating the upper operating head. Preferably, the rotation is controlled when the upper operating head is at a distance such as to guarantee the non-interference of the wheel with the tools fixed to the upper operating head. Preferably, the upper tools have respective ends distal from the upper arm (that is, from the upper head) lying in a plane perpendicular to the second axis of rotation, that is, the axis of rotation of the upper operating head.

It should be noted that the upper fitting tool and the wall pressing tool are fixed to the upper operating head to act in conjunction, thereby being simultaneously in the active configuration or simultaneously in the non-interference configuration;
  that is to say, the upper fitting tool and the wall pressing tool are either both activated (in the active configuration) or both deactivated (in the non-interference configuration); this is also thanks to the fact that the head rotates between separate predetermined positions.

This reduces the possibility of error of the tyre repair specialist.

In an embodiment, the rotation of the operating head between the possible operating configurations is controlled by a first actuator, with three stages. The first actuator defines a first stage wherein the upper operating head is positioned in the first operating configuration, a second stage wherein the upper operating head is positioned in the second operating configuration, a third stage wherein the upper operating head is positioned in a third operating configuration, thereby defining a predetermined sequence as a function of a predetermined direction of rotation (that is to say, forwards) of the upper operating head. The first actuator is connected to a control unit; the control unit controls the movement of the first actuator from one stage to the other, according to the following predetermined sequence of stages: first stage, second stage, third stage, wherein the passage from the first stage to the second stage and the passage from the second stage to the third stage correspond to a rotation of the upper operating head according to the forwards direction and the passage from the third stage to the first stage corresponds to a rotation of the upper operating head in an opposite direction (that is, backwards).

This increases the reliability of the tyre changer machine; the introduction of an actuator and a predetermined sequence of operations limits the risk of error by the operator, whose duty is merely that of activating the control unit of the actuator. The first actuator operates together with a first system for locking of the rotation, which prevents rotation of the upper arm during each operational step. Preferably, the first system for locking the rotation comprises a pin controlled electrically, for example using a second actuator, but other solutions are not excluded.

The lower operating head of the tyre changer machine comprises at least two lower tools angularly spaced from each other by a predetermined angle, to be selectively and alternatively positionable in an operating configuration by rotation of the lower operating head. Preferably, the lower tools, fixed to the lower operating head, are angularly spaced by an angle of 90 degrees.

Preferably, the lower tools have respective ends distal from the lower arm (that is, from lower upper head) lying in a plane perpendicular to the third axis of rotation, that is, the axis of rotation of the lower operating head.

Preferably, the lower tools comprise a lower bead breaker disc and a lower fitting tool. It should be noted that, preferably, the lower fitting tool has an elongate shape; preferably, elongate along a longitudinal axis contained in a plane parallel to the axis of rotation of the wheel-holder unit and perpendicular to the axis of rotation of the lower operating head.

Moreover, preferably, the lower fitting tool has an end configured for coupling with the lower operating head and a free end (if necessary, shaped) to operate on the tyre. Preferably, the lower fitting tool, in its operating configuration, is oriented (elongate) along a longitudinal axis which is substantially parallel to the axis of rotation of the wheel-holder unit (that is to say, to the first vertical axis of rotation).

The embodiment illustrated allows at least two tools, designed to act on the lower bead, to be integrated on a single operating head (the one dedicated to working on the lower bead of the tyre). The lower operating head is supported and moved by a single arm, with a consequent reduction of the overall dimensions and the actuators necessary to move the tools into the respective operating positions in contact with the wheel. It should be noted that, preferably, the positioning of the lower tools in the operating positions, in contact with the wheel, is made possible by a movement of the wheel-holder unit (by translating along a direction perpendicular to the axis of rotation of the wheel-holder unit) and/or by translating the lower arm in a direction parallel to the axis of rotation of the wheel-holder unit (using the lower carriage) and perpendicularly to the axis of rotation of the wheel-holder unit (by a movement of extension and withdrawal of the lower arm with respect to the lower carriage).

Preferably, the lower fitting tool is configured to adopt two positions, an active one and a rest one. Preferably, the lower fitting tool rotates about a fourth axis "D", transversal to the axis of rotation "C" of the lower operating head, to pass from the rest position to the active position.

Preferably, the lower fitting tool in the rest position is angled by at least 70 degrees relative to the same tool in the active position. In other words, the rotation of the lower fitting tool must preferably be greater than 70 degrees to allow the lower fitting tool to pass from the rest position to the active position.

This solution allows a reduction in the minimum angular distance which there must be between the tools of the lower operating head to avoid interference. Moreover, the reduction in the angular distance allows a reduction of the overall dimensions; the tools of the lower operating head never occupy the lower part of the head, without limiting, therefore, the stroke of the lower carriage to avoid interference with the base of the tyre changer machine.

This invention also defines a method for fitting (and removing) a tyre relative to a corresponding rim of a vehicle wheel, comprising the following steps:
preparing a rotary wheel-holder unit;
preparing a rotating upper operating head equipped with an upper fitting tool and at least one further tool;
preparing a wall pressing tool connected to the upper operating head and oriented in a direction concordant with the upper fitting tool for being positioned in a working position at the same time as the upper fitting tool;
preparing a lower operating head equipped with at least one lower bead breaker tool and at least one lower fitting tool, angularly spaced for being selectively and alternatively positionable by rotating the lower operating head into an operating configuration, wherein the tool selected is oriented towards the wheel mounted on the wheel-holder unit;
fixing the wheel to the wheel-holder unit;
rotating the lower operating head for selecting the lower fitting tool, orienting it towards the lower side of the wheel;
moving the lower fitting tool towards an upper edge of the rim, by moving a lower carriage, for positioning the lower fitting tool in its working position, between a lower bead of the tyre and the upper edge of the rim;
rotating the wheel-holder unit and the wheel fixed thereto to insert the lower bead of the tyre inside a housing defined by the edges of the rim;
stopping the rotation of the wheel-holder unit and the wheel fixed to it at the end of the insertion of the lower bead inside the housing of the rim;
moving the lower operating head away from the wheel;
rotating the upper operating head in an operating configuration wherein the upper fitting tool and the wall pressing tool are oriented towards an upper side of the wheel, in such a way that the tools can be positioned simultaneously in the respective operating positions in contact with the wheel;
moving the upper operating head towards the wheel by moving an upper carriage and by relative movement of the upper operating head and the wheel-holder unit to simultaneously move the upper fitting tool and the wall pressing tool in the respective operating positions in contact with the wheel;
rotating the wheel-holder unit and the wheel fixed thereto.

In a particular embodiment, the upper operating head comprises three tools angularly spaced from each other by a predetermined angle, to be selectively and alternatively positionable in an operating configuration by rotation of the upper operating head.

More specifically, when the tools are the upper bead breaker tool, the removal tool and the upper fitting tool connected to the wall pressing tool, the method comprises a step of generating a rotational movement of the upper operating head in a predetermined direction suitable for selecting an operating configuration of the upper operating head selecting, in sequence:
the upper bead breaker tool,
the removal tool,
the upper fitting tool and the wall pressing tool connected to it.

In the particular embodiment in which the rotation of the upper operating head between the possible operating configurations is controlled by a first three-stage actuator, the tyre changer machine comprises a mechanism for locking the rotation of the upper head. In this case, the method also comprises the following steps:
disconnecting a first system for locking the rotation of the upper end;
rotating, using a first three-stage actuator, the upper operating head until it reaches an operating configuration between the first, second and third operating configurations;
reconnecting the first locking system when reaching the predetermined operating configuration.

Preferably, the disconnection and the reconnection are performed automatically. Preferably, the disconnection and the reconnection of the pin are controlled by a second electro-mechanical actuator.

Preferably, the tools coupled to the upper operating head (upper fitting tool, removal tool, upper bead breaker disc and wall pressing tool) have respective ends distal from the upper arm lying substantially in a plane perpendicular to the axis of rotation of the upper operating head.

Preferably, the tools coupled to the lower operating head (lower fitting tool, lower bead breaker disc) have respective ends distal from the lower arm lying substantially in a plane perpendicular to the axis of rotation of the lower operating head.

This prevents the risk of interference with the rim by tools positioned in a deactivated position, during the use of a tool (connected to the same operating head) which, on the contrary, is in the activated position, that is to say, in the relative operating configuration.

In a particular embodiment, the lower fitting tool is movable between a rest position and an active position, and is configured to adopt alternatively the rest position or the active position. In this case, the method also comprises the step of moving the lower fitting tool from a rest position to an active position.

BRIEF DESCRIPTION OF THE DRAWINGS

This and other features of the invention will become more apparent from the following detailed description of a preferred, non-limiting example embodiment of it, with reference to the accompanying drawings, in which:

FIGS. 2 and 3 show a perspective view and a side view, respectively, of a construction detail of the tyre changer machine of FIG. 1, according to this invention;

DESCRIPTION OF THE PREFERRED EMBODIMENTS

Figure 1:
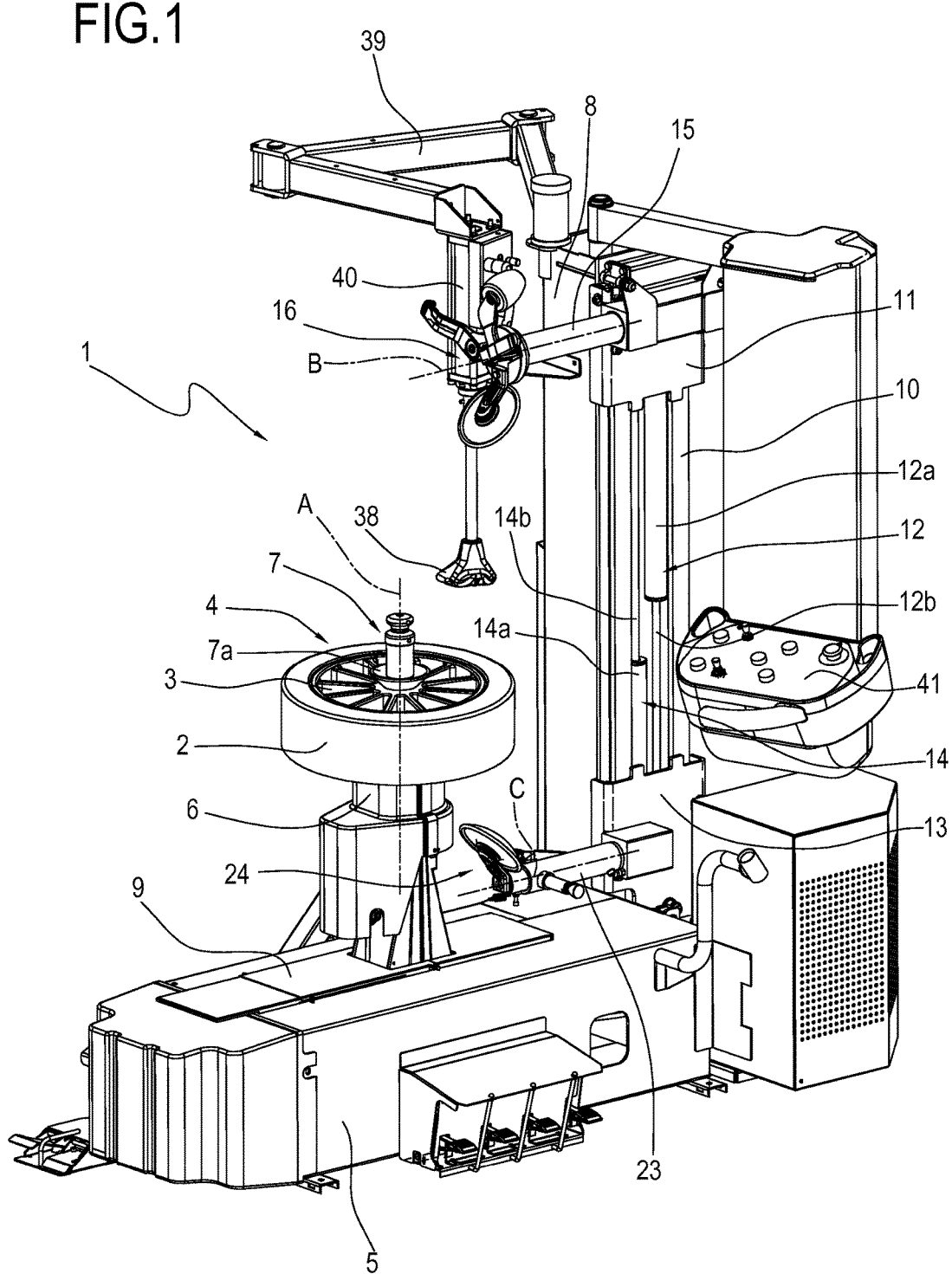
FIG. 1 is a perspective view with some parts cut away in order to better illustrate others of a tyre changer machine according to this invention.
Figure 4:
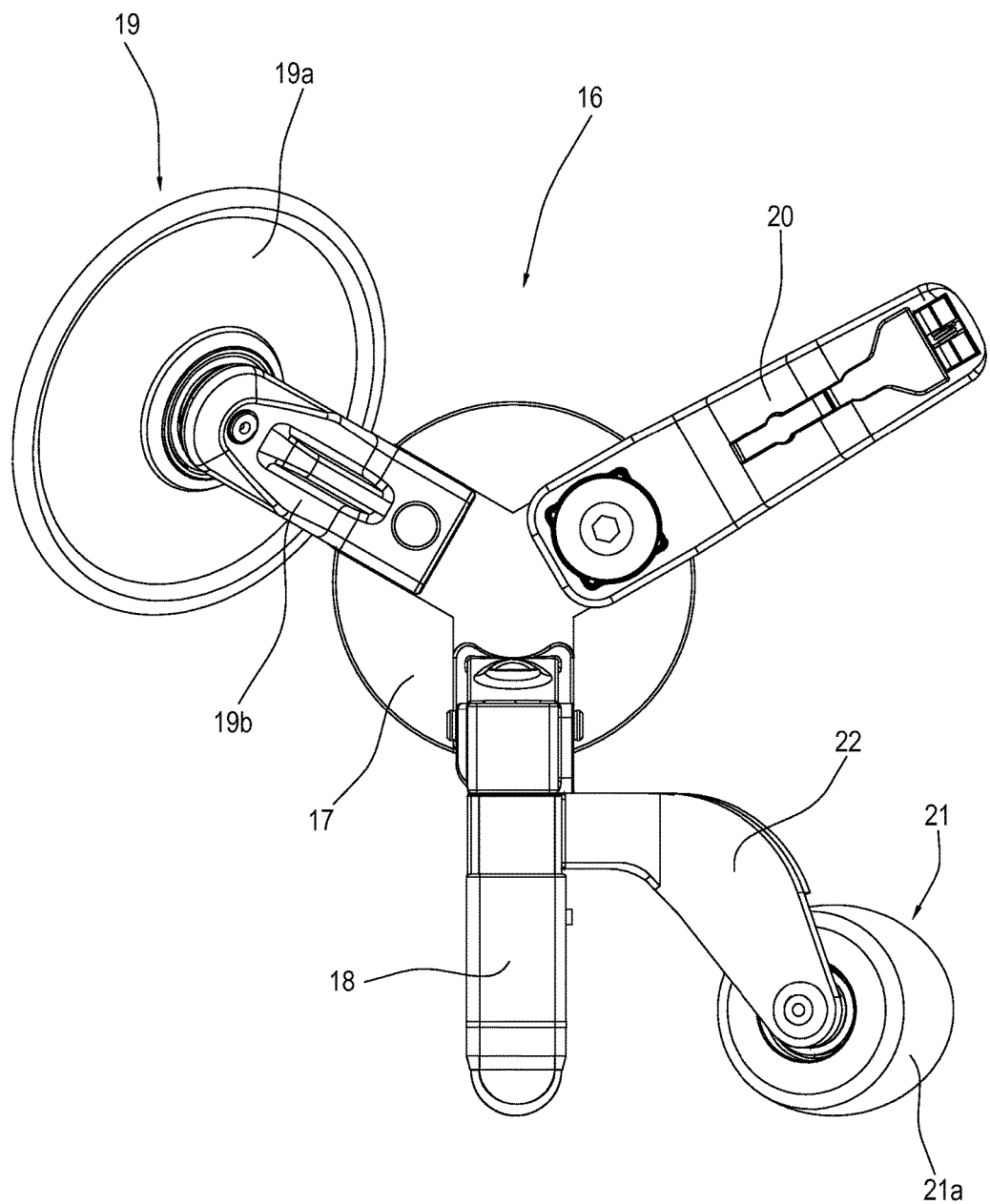
FIG. 4 shows a front view of a tool holder head according to this invention.
Figure 5:
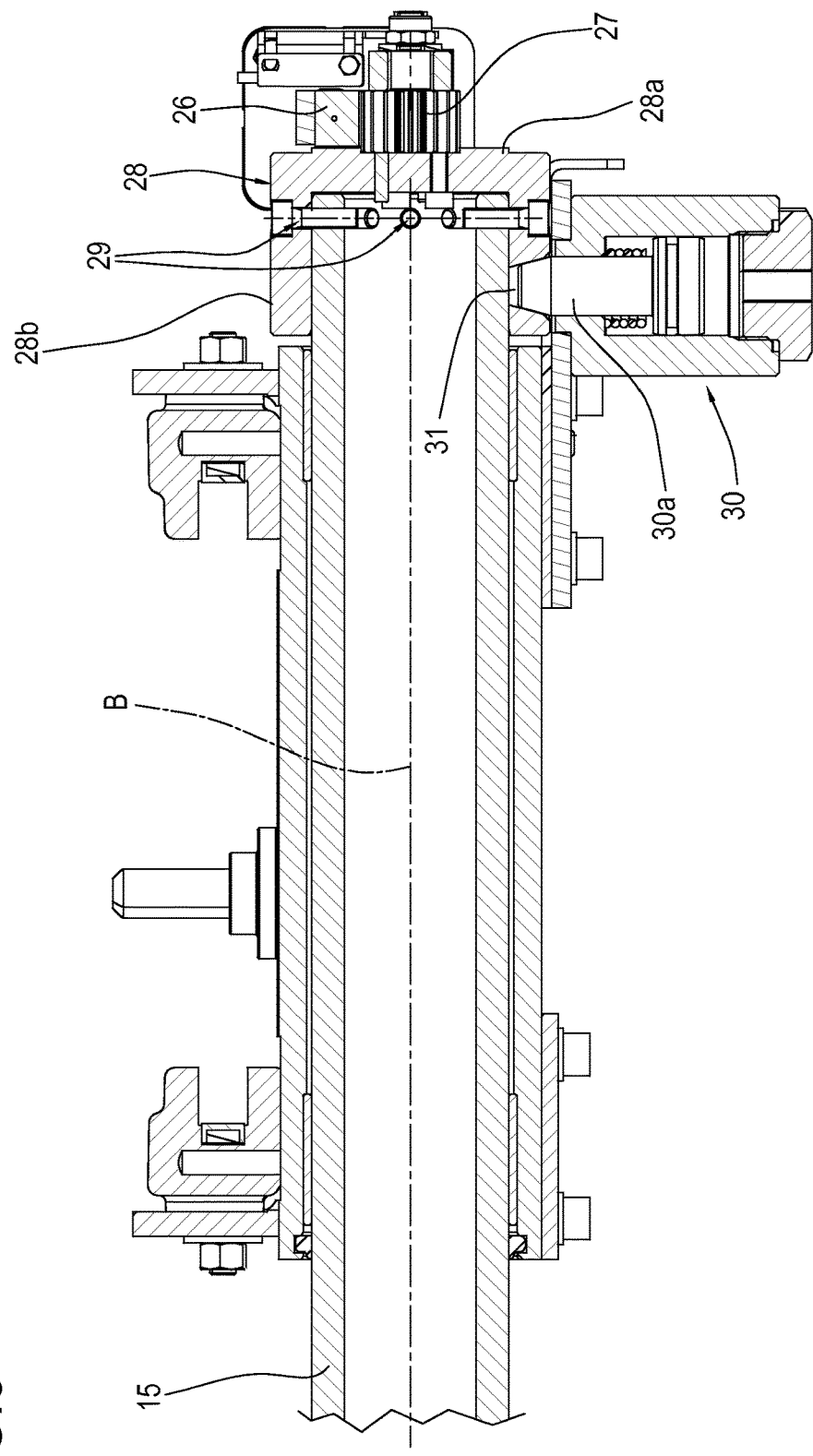
FIG. 5 illustrates the cross-section V-V of FIG. 3, with some parts cut away to better illustrate others.

With reference to the accompanying drawings, the numeral 1 denotes a machine for fitting and removing a tyre 2 from a corresponding rim 3 of a wheel 4 (that is, a tyre changer machine) according to this invention.

The machine 1 comprises a base 5. The base 5 comprises a wheel-holder unit 6. The wheel-holder unit 6 is designed to house the wheel 4 and to rotate it about a first axis of rotation "A", in order to allow the above-mentioned removing and fitting operations. Preferably, the first axis of rotation "A" is vertical.

The wheel-holder unit 6 comprises a hollow shaft, connected to rotation means (not shown), and a perforated supporting surface (not shown, of known type) to allow a clamping tool (or rod) 7 to pass through. Typically, the clamping rod 7 (of known type) is defined by a longitudinal shaft having a conical, intermediate or end, portion 7a, for the purpose of centering the wheel 4.

The wheel 4 is locked so as to rotate as one with the shaft of the wheel-holder unit 6. For this purpose, after positioning the wheel 4 on the supporting surface, the clamping rod 7 is inserted in the hole of the wheel-holder unit 6 and then tightened, by means of a suitable mechanism, to keep the conical portion pressed on the rim 3.

When the wheel 4 is placed on a supporting surface with a vertical axis, the tyre 2 has a lower side facing towards the base 5 and an upper side facing in an opposite direction relative to the lower side. Each of the two sides comprises a bead, that is to say, the reinforced edge of the tyre 2, in contact with the annular edge of the rim 3. The bead of the upper side will hereafter be referred to as the upper bead and, similarly, the bead of the lower side will hereafter be referred to as the lower bead. The edge of the rim 3 corresponding to the upper bead will hereafter be referred to as the upper edge and, similarly, the edge corresponding to the lower bead will hereafter be referred to as the lower edge. The space between the two annular edges of the rim defines the housing in which the tyre is positioned, during the fitting step, or from which the tyre is removed, during the removing step. It should be noted that in the following description the adjectives "upper" and "lower" are used without thereby intending to limit the scope of protection afforded by the invention to the fact that the axis of rotation of the wheel is perpendicular to the supporting surface of the machine ("vertical axis"; this is preferred embodiment), since the axis might also be "horizontal" or oriented in another way.

The wheel-holder unit 6 is coupled to the base 5 for being moved in the direction perpendicular to the first axis of rotation "A". More specifically, the wheel-holder unit 6 comprises a plate 9 integral with it. The plate 9 covers a groove in the base 5, the groove having the purpose of a guide for the shaft of the wheel-holder unit 6. It should be noted that the plate 9 prevents the accidental falling of objects in the groove, preventing damage to the tyre changer machine 1.

In the embodiment illustrated, the tyre changer machine 1 comprises, associated with the base 2, a column 8 extending in a direction parallel to the first axis of rotation "A". Preferably, the column 8 extends vertically. The wheel-holder unit 6 may therefore be moved towards or away from the column 8, allowing the tyre changer machine 1 to operate on tyres with different diameters.

The column 8 comprises a guide 10 extending along the main direction of extension of the column 8. An upper carriage 11 is slidably constrained to the guide 10 to move along the guide 10 upwards or downwards. A first movement system 12 is associated with the upper carriage 11 with the purpose of moving the upper carriage 11 between a first upper end position and a second lower end position along the guide 10.

The first movement system 12 associated with the upper carriage 11 comprises a first piston 12a. The first piston 12a comprises an axial hole for being slidably coupled to a first guide rod 12b. More specifically, the first rod guide 12b is integral with the column 8 and the upper end of the first piston 12a is coupled to the upper carriage 11.

An upper arm 15 comprises a first and a second end. The first upper end of the arm 15 is coupled to the upper carriage 11. More specifically, the coupling is such as to allow the rotation of the upper arm 15 about a second axis of rotation "B". Preferably, the second axis of rotation "B" is perpendicular to the axis of rotation "A". Preferably, the second axis of rotation "B" is parallel to the direction in which the wheel-holder unit 6 can be moved relative to the base 5. The second end of the upper arm 15 is connected to an upper operating head 16, fixed to the upper arm 15.

A lower carriage 13 is slidably constrained to the guide 10 to move along the guide 10 upwards or downwards. A second movement system 14 is associated with the lower carriage 13 to move the lower carriage 13 between a first lower end position and a second upper end position along the guide 10. Preferably, the upper carriage 11 and the lower carriage 13 are slidably constrained to the guide 10.

The second movement system 14 associated with the lower carriage 9 comprises a second piston 14a. The second piston 14a comprises an axial hole for being slidably coupled to a second guide rod 14b. More specifically, the second rod guide 14b is integral with the column 8 and the lower end of the second piston 14a is coupled to the lower carriage 13.

A lower arm 23 comprises a first and a second end. The first end of the lower arm 23 is fixed to the lower carriage 13. The second end of the lower arm 23 is coupled to a lower operating head 24.

The upper operating head 16 consists of a body 17 comprising at least one upper fitting tool 18 and at least one further tool. The upper fitting tool 18 is defined by a body having an elongate shape in a direction for being operatively inserted between the upper bead of the tyre 2 and the upper edge of the rim 3, for positioning a first portion of the upper bead inside the housing of the rim 3.

Preferably, the upper fitting tool 18 and the further tool are angularly spaced from each other by a predetermined angle to be selectively and alternatively positionable in an operating configuration (that is to say, a working configuration) by rotation (that is to say, rotational movement) of the upper operating head 16.

Even more preferably, the upper fitting tool 18 and the further tool are angularly equidistant.

Preferably, the further tool is an upper bead breaker tool 19 or removal tool 20. The removal tool 20 has an elongate shape in a direction, for example claw-like, for being inserted between the upper bead of the tyre 2 and the upper edge of the rim 3, for gripping and extracting a portion of the upper bead from the housing of the rim 3. The upper bead breaker tool 19 comprises a circular body 19a supported by a supporting arm 19b. The circular body 19a is configured for pressing on the upper bead of the tyre 2 towards the lower bead, for causing the detachment from the upper edge of the rim 3. The coupling between the circular body 19a and the supporting arm 19b allows the circular body 19a to rotate in contact with the wheel 4 when located in the working position.

According to this invention, a wall pressing tool 21 is connected to the upper operating head 16, preferably in a rigid fashion.

The wall pressing tool 21 is oriented in a direction concordant with the upper fitting tool 18 so it can be placed in a working position, which is operatively in contact with the wheel, simultaneously with the upper fitting tool 18.

Preferably, the wall pressing tool 21 is directly connected to the upper fitting tool 18. Preferably, the wall pressing tool 21 is connected to the upper fitting tool 18 by a connecting arm 22.

In the particular embodiment illustrated, the connecting arm 22 has two ends. The first end of the connecting arm 22 is connected to the upper fitting tool 18. The second end of the connecting arm 22 is coupled to the contact element 21a of the wall pressing tool 21. The coupling between the contact element 21a and the connecting arm 22, allows the contact element 21a to rotate when, in the operating position, it is in contact with the wheel 4 rotated by the wheel-holder unit 6. Preferably, the contact element 21a has an ogival shape in order to better adapt to the profile of different types of tyres 2.

In the embodiment illustrated, in addition to the upper fitting tool 18 coupled to the wall pressing tool 21, the upper operating head 16 comprises two further tools, the upper bead breaker disc 19 and the removal tool 20. The upper operating head 16 is thus configured to adopt three operating configurations:
  a first operating configuration wherein the bead breaker disc 19 is oriented towards the upper side of the tyre 2;
  a second operating configuration wherein the removal tool 20 is oriented towards the upper side of the tyre 2;
  a third operating configuration wherein the upper fitting tool 18 and the wall pressing tool 21 connected to it are simultaneously oriented towards the upper side of the tyre.

Preferably, the tools 18, 19 and 20, fixed to the upper operating head 16, are angularly spaced by an angle of 120°, which guarantees the non-interference between the operating tool (or pair of tools) and the inactive tools. Preferably, the tools 18, 19, 20 of the upper operating head 16 have respective ends distal from the upper arm 15 lying in a plane perpendicular to the second axis of rotation "B".

During the various operating steps, the tools are subjected to forces deriving from the contact with the wheel 4 rotated by the wheel-holder unit 6. These forces tend to rotate the operating tool (as well as translate in a direction parallel to the axis of the wheel, because the tyre is partly elastic). The body 17 of the upper operating head 16 is therefore shaped to house in the base the tools 18, 19, 20 and prevent the above-mentioned movements. More specifically, the body 17 of the upper operating head 16 has an outer face to which the tools 18, 19, 20 are fixed.

Preferably, the body 17 of the upper operating head 16 comprises radial grooves (defined on the outer face); the radial grooves have side walls in contact with the base of the tools and constitute a rotation lock by interference, to prevent an accidental rotation of the tools 18, 19, 20 relative to the upper operating head 16. Therefore, preferably, each radial groove □ouses the base of a tool.

The rotational movement of the upper arm 15 is controlled by a first actuator 25. The first actuator 25 moves a rack 26 coupled to a gear wheel 27. The gear wheel 27 is coupled to the upper arm 15 to rotate around the axis of rotation "B".

More specifically, the first end of the upper arm 15 is closed by a cap 28 fixed to the upper arm 15 by radial fixing elements 29. The cap 28 has a shaped face 28a, perpendicular to the axis of rotation of the upper arm 15, for housing the gear wheel 27. The gear wheel 27 is fixed to the shaped face 28a by means of axial locking elements 29a. Preferably, the first actuator 25 is a three-stage actuator, for rotating the upper operating head 16 between the three above-mentioned operating configurations. The first actuator 25 has a first stage wherein the upper operating head 16 is positioned in the first operating configuration, a second stage wherein the upper operating head 16 is positioned in the second operating configuration, a third stage wherein the upper operating head 16 is positioned in a third operating configuration, thereby defining a predetermined sequence (first stage, second stage, third stage) as a function of a predetermined direction of rotation (that is to say, forwards) of the upper operating head 16. A control unit 41 is connected to the first actuator 25 to control the movement of the first actuator 25 from one stage to the other. The passage from the first stage to the second stage and the passage from the second stage to the third stage correspond to a rotation of the upper operating head 16 according to the forwards direction, whilst the passage from the third stage to the first stage corresponds to a rotation of the upper operating head 16 in an opposite direction (that is, backwards.

Figure 6:
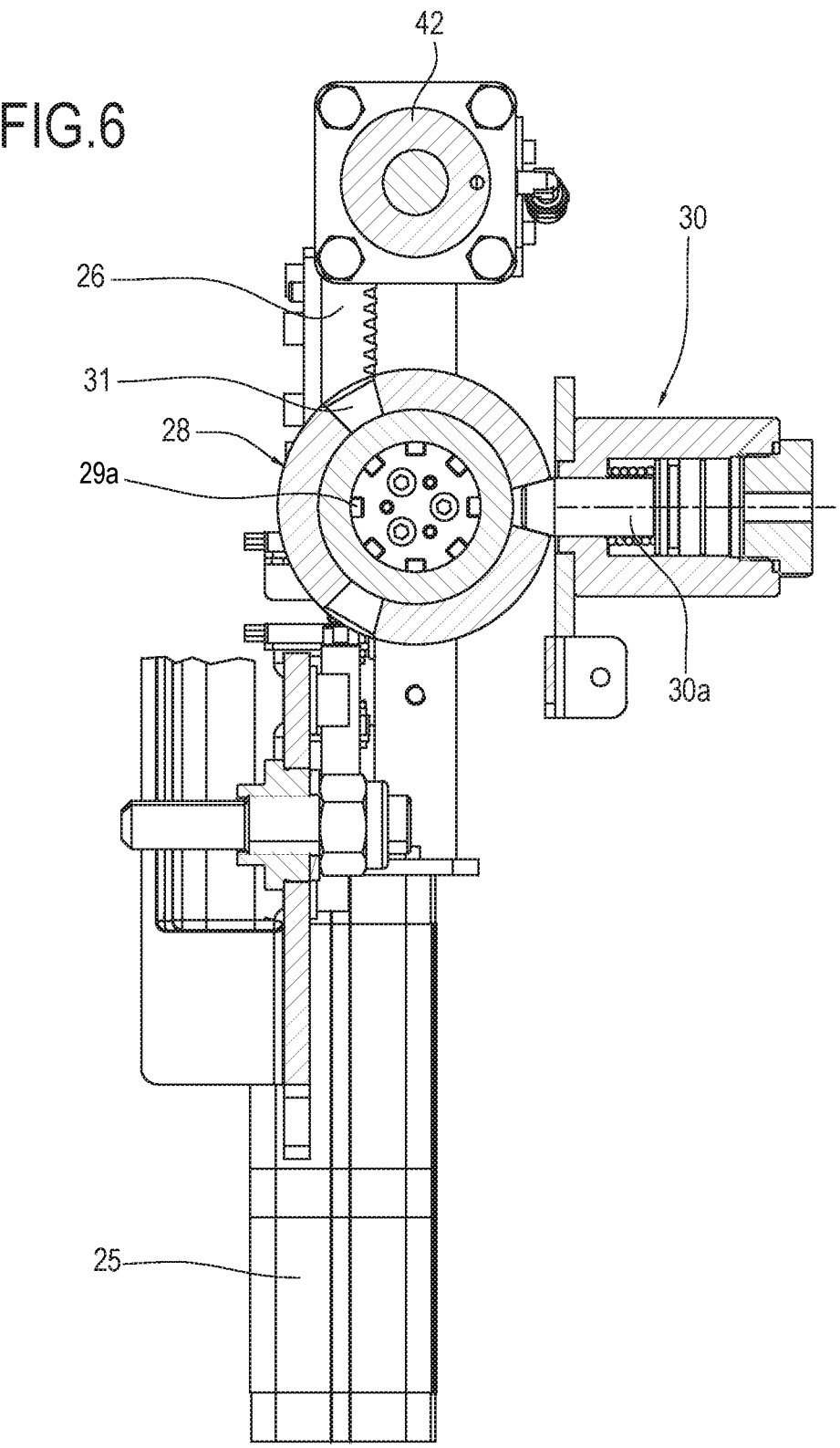
FIG. 6 illustrates the cross-section VI-VI of FIG. 3, with some parts cut away to better illustrate others.

During each operating step, the rotational motion of the upper arm 15 is locked by a first system 30 for locking the rotation. Preferably, the first system 30 for locking the rotation comprises a first pin 30a designed to be inserted in a radial hole 31 made in the side wall 28b of the cap 28. In the embodiment illustrated, wherein the upper operating head 16 can adopt alternatively three operating configurations, the lateral surface of the cap 28 has three radial holes 31 (FIG. 6), angularly spaced by 120°.

Preferably, the disconnection and reconnection of the first pin 30a are controlled by a second actuator. The second actuator controls the insertion of the first pin 30a when the upper arm 15 has finished its rotational movement to reach a certain operating position. It should be noted, however, that the insertion control might be performed during the rotational movement, that is, during the passage between two different operating positions of the upper arm 15, if a spring exerts a force on the pin which is able to automatically insert it when it is at one of the radial holes 31.

In the particular embodiment illustrated, the machine 1 also comprises a third actuator 42 for moving the upper arm 15 in the direction of the second axis of rotation "B". It should be noted that the movement of the upper arm 15 causes the movement of the components connected thereto, in particular the upper operating head 16, the first actuator 25, the rack 26, the gear wheel 27 and the locking system 30, thereby defining an upper operating unit integral with the upper arm 15 in the translational motion controlled by the third actuator 42.

The third actuator 42 moves the upper arm 15 between a working position, wherein the tools of the upper head 16 are aligned with the edge of the rim 3 to perform all the operations, and a disengaged position wherein the upper operating head 16 is away from the working zone, to facilitate the operations for positioning and removing the wheel 4 on and from the wheel-holder unit 6. Preferably, the third actuator 42 has two stages. Preferably, the third actuator 42 is a cylinder with two stages.

The lower operating head 24 is coupled to the second end of the lower arm 23 and provided with at least one lower tool designed to operate on a lower side of the tyre.

Preferably, the lower operating head 24 comprises at least two tools, that is, a lower bead breaker disc 32 and a lower fitting tool 33. The lower bead breaker disc 32, in a similar manner to the upper bead breaker disc 19, is configured for pressing on the lower bead of the tyre 2 and rotating about a relative axis when it is in contact with the wheel 4 rotated by the wheel-holder unit 6. The lower fitting tool 33 is defined by a body having an elongate shape in a direction for being operatively inserted between the lower bead of the tyre 2 and the upper edge of the rim 3, for positioning, at the start of the fitting step, the lower bead inside the housing of the rim 3.

Preferably, the tools of the lower operating head 24 are spaced radially by a predetermined angle, to be selectively and alternatively positionable in an operating configuration by rotation of the lower operating head 24 about a third axis of rotation "C". Preferably, the third axis of rotation "C" and the second axis of rotation "B" are coplanar or parallel. Preferably, the tools of the lower operating head are spaced radially by an angle of 90°, to limit the overall dimensions in the proximity of the base 5. Preferably, the tools 32, 33 of the upper operating head 24 have respective ends distal from the lower arm 23 lying in a plane perpendicular to the third axis of rotation "C".

It should be noted that the lower operating head 24 is thus configured to adopt two operating configurations:
  a first operating configuration wherein the lower bead breaker disc 32 is oriented towards the lower side of the wheel 4;
  a second operating configuration wherein the lower fitting tool 33 is oriented towards the lower side of the wheel 4.

The lower arm 23 comprises a second locking system 34, for locking the rotation of the lower operating head 24 in each of the possible operating configurations. Preferably, the second locking system comprises a second pin 34a.

Figure 7:
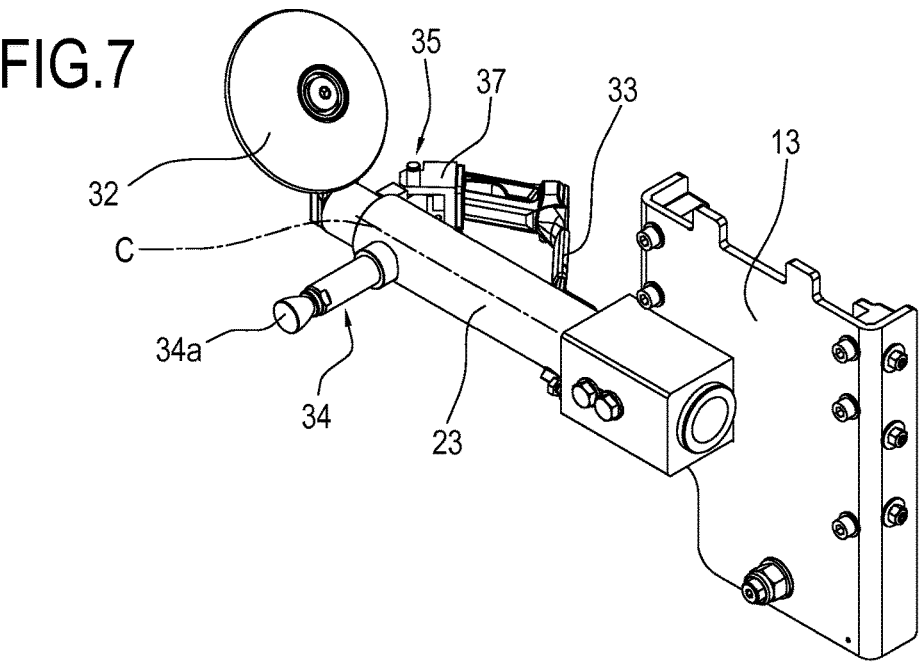
FIGS. 7 and 8 show perspective views of a construction detail of the tyre changer machine of FIG. 1 according to this invention, wherein a lower fitting tool is in two corresponding different positions, the first a rest position and the second an operational position.
Figure 8:
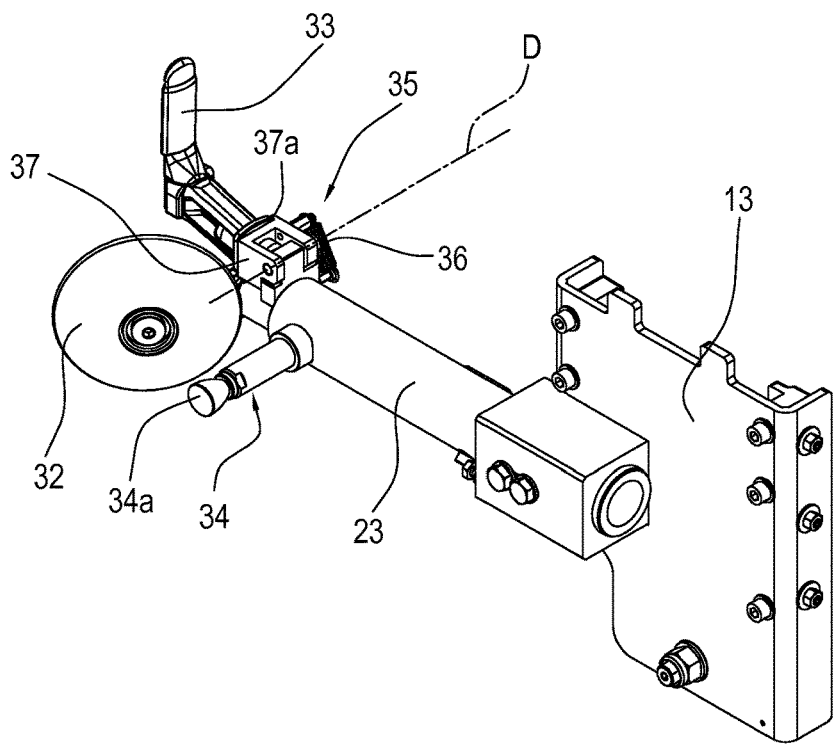

The lower fitting tool 33 is configured to adopt alternatively a rest position (FIG. 7), adopted during the first operating configuration of the lower operating head 24, or an active position (FIG. 8), adopted during the second operating configuration of the lower operating head 24. Preferably, the lower fitting tool 33 rotates between the active position and the rest position by means of a hinge mechanism 35. Preferably, the axis of rotation of the hinge mechanism 35 is perpendicular to the third axis of rotation "C".

It should be noted that the hinge mechanism 35 comprises a return spring 36 connected to the lower fitting tool 33 to oppose its movement both away from the rest position and away from the active position. In the particular embodiment illustrated, when the tool is in the active position, the return spring 36 extends during a portion of the rotation of the lower fitting tool 33 towards the rest position, generating a force which opposes the movement. After performing a rotation by a predetermined angle, the return spring 36 exceeds a dead point and starts to shorten, applying a force which facilitates the movement of the lower fitting tool 33 to the rest position. The opposite occurs during the movement of the tool from the rest position to the active position. It should be noted that, by adopting this solution, the active position and the rest position are stable positions for the lower fitting tool 33.

It should also be noted that the base of the lower fitting tool 33 is connected to the hinge mechanism 35 by a shaped plate 37 equipped with an anti-rotation shoulder 37a.

In the embodiment illustrated, the tyre changer machine 1 also comprises an auxiliary tool 38 which can be associated with the upper side of the tyre 2 during the fitting step. The auxiliary tool 38 is configured for pressing on the upper side wall of the tyre, in a zone in which the upper bead has already been inserted in housing of the rim 3. In its operating step, the auxiliary tool 38 is integral with the wheel 4 rotated by the wheel-holder unit 6.

In the particular embodiment illustrated, the auxiliary tool 38 is connected to the column 8 by means of an articulated arm 39 which allows the movement in a plane perpendicular to the first axis of rotation "A". The auxiliary tool 38 is moved in a direction parallel to the first axis of rotation "A" by a fourth actuator 40, coupled to the articulated arm 39.

This invention also provides a method for fitting/removing the tyre 2 on/from the corresponding rim 3 of the wheel 4. It should be noted that the following description does not limit the scope of protection to the particular embodiment described.

The removal operation comprises a preliminary procedure for breaking the bead of the tyre, followed by the actual removal, according to the following steps:
  preparing a rotatable wheel-holder unit 6;
  fixing the wheel 4 to the wheel-holder unit 6;
  moving the wheel-holder unit 6 towards the column 8, and/or moving the upper arm 15 towards the wheel-holder unit 6;
  preparing the upper operating head 16 in its first operating configuration, that is to say, selecting the upper bead breaker disc 19;
  preparing the lower operating head 24 in its first operating configuration, that is to say, selecting the lower bead breaker disc 32;
  moving the upper operating head 16 towards the wheel 4 by moving the upper carriage 11 to carry the upper bead breaker tool 19 into contact with the upper bead of the tyre 2;
  moving the lower operating head 24 towards the wheel 4 by moving the lower carriage 13 to carry the lower bead breaker tool 32 into contact with the lower bead of the tyre 2;
  rotating the wheel-holder unit 6 and the wheel 4 fixed thereto;
  stopping the rotation of the wheel-holder unit 6 and of the wheel 4 fixed to it upon completion of the bead breaking step (at this point, the bead breaking is completed);
  moving the upper operating head 16 away from the wheel 4 by moving the upper carriage 11, to allow rotation of the upper operating head 16 and changing of the tool;
  moving the lower operating head 24 away from the wheel 4 by moving the lower carriage 13;
  operating the control unit 41 so as to carry the upper operating head 16 to the second operating configuration, that is to say, selecting the removal tool 20; the operation of the control unit 41 comprises the automatic disconnection of the first system 30 for locking the rotation of the upper arm 15 and its subsequent connection when the second operating configuration is reached;

moving the upper operating head 16 towards the wheel 4 by moving the upper carriage 11, to insert the removal tool 20 between the upper bead of the tyre 2 and the upper edge of the rim 3;

moving the upper operating head 16 away from the wheel 4 to allow the removal tool 20 to carry the upper bead of the tyre 2 beyond the upper edge of the rim 3;

rotating the wheel-holder unit 6 and the wheel 4 fixed thereto;

when the upper bead of the tyre 2 has a completely passed the upper edge of the rim 3, lifting of the lower operating head 24 to allow the lower bead of the tyre 2 to also escape from the housing defined by the edges of the rim 3;

stopping the rotation of the wheel-holder unit 6 and of the wheel 4 fixed to it upon completion of the removal step;

moving the upper operating head 16 away from the wheel 4 by moving the upper carriage 11, to facilitate movement of the tyre 2 completely detached from the rim 3, and allow rotation of the upper operating head 16 for changing of the tool.

The fitting of the tyre 2 on the rim 3 comprises the following operating steps:

selecting the lower fitting tool 33 on the lower operating head 24, if necessary by rotating the head;

moving the lower operating head 24 towards the wheel 4 by moving the lower carriage 13, to carry the lower fitting tool 33 between the lower bead of the tyre 2 and the upper edge of the rim 3;

rotating the wheel-holder unit 6 and the wheel 4 fixed thereto;

stopping the rotation of the wheel-holder unit 6 and the wheel 4 fixed to it at the end of the insertion of the lower bead inside the housing of the rim 3;

moving the lower operating head 24 away from the wheel 4 by moving the lower carriage 13;

operating the control unit 41 to carry the upper operating head 16 to its third operating configuration (that is, selecting the upper fitting tool 18 coupled to the wall pressing tool 21); this step may also occur at the start of the fitting step;

moving the upper operating head 16 towards the wheel 4 by moving the upper carriage 11 (parallel to the axis "A" of the wheel-holder unit) and by relative movement of the upper operating head 16 and the wheel-holder unit 6 perpendicularly to the axis of the wheel-holder unit "A", to carry the tools 18, 21 to the respective operating positions in contact with the wheel 4; once the desired pair of tools has been selected, by rotating the upper operating head 16, the upper operating head 16 itself is moved towards the wheel 4 until the tools 18, 21 are in the respective operating positions; more specifically, the upper fitting tool 18, in its working position, is in contact with the tyre and is inserted between the upper bead of the tyre 2 and the upper edge of the rim 3 to simultaneously operate the wall pressing tool 21, positioned on the upper side of the wheel 4; the operation of the control unit 41 comprises the automatic disconnection of the first system 30 for locking the rotation of the upper arm 15 and its subsequent automatic connection when the third operating configuration is reached;

rotating the wheel-holder unit 6 and the wheel 4 fixed thereto;

stopping the rotation of the wheel-holder unit 6 and of the wheel 4 fixed to it upon completion of the fitting step.

What is claimed is:

1. A machine for fitting and removing a tyre from a corresponding rim of a wheel for a vehicle, comprising:
   a wheel-holder unit rotating about a first vertical axis of rotation;
   a column having a guide oriented vertically;
   an upper arm and a lower arm, each having a first and a second end;
   an upper carriage coupled to the guide of the column and connected to the first end of the upper arm;
   an upper operating head, connected to the second end of the upper arm, rotating about a second axis of rotation, provided with at least one upper fitting tool having an elongate shape along a longitudinal direction, to be operatively inserted between a bead of the tyre and an annular edge of the rim and provided with at least one further tool, angularly spaced from the upper fitting tool by a predetermined angle, so that the tools are alternatively selectable by rotating the upper operating head in respective operating configurations in which they are oriented towards the wheel to be positioned in a working position in contact with the tyre by translation of the upper operating head;
   a lower operating head, coupled to the second end of a lower arm and provided with at least one tool designed to be operatively acting on a lower bead of the tyre, the lower arm being slidably coupled to the column, wherein the machine comprises a wall pressing tool connected to the upper operating head and oriented in a direction concordant with the upper fitting tool for being positioned simultaneously with the upper fitting tool in a working position, wherein the wall pressing tool and the upper fitting tool are both in contact with the wheel positioned on the wheel-holder unit.

2. The machine according to claim 1, comprising a lower carriage coupled to the guide of the column and connected to the first end of the lower arm.

3. The machine according to claim 1, wherein the upper fitting tool, when selected in the working position, is positioned with its longitudinal axis parallel to the first vertical axis of rotation and wherein the wall pressing tool is positioned laterally at a predetermined distance relative to a plane passing through the first vertical axis of rotation and the upper fitting tool.

4. The machine according to claim 1, wherein the wall pressing tool is positioned at a distance from the first vertical axis of rotation greater than a distance at which the upper fitting tool is positioned relative to the first vertical axis of rotation.

5. The machine according to claim 1, wherein the wall pressing tool comprises a contact element configured to rotate about a relative axis and/or having an ogival shape.

6. The machine according to claim 1, wherein the wall pressing tool is connected rigidly to the upper fitting tool by means of a connecting arm.

7. The machine according to claim 1, wherein the further tool of the upper operating head is an upper bead breaker disc or a removal tool having a shape which is elongate in a direction to be inserted between the bead of the tyre and the edge of the rim.

8. The machine according to claim 1, wherein the upper operating head comprises, in addition to the upper fitting tool, two further tools, that is, an upper bead breaker disc upper and a removal tool and wherein the tools are angularly spaced at predetermined angles to be alternatively selectable by rotation, thereby defining respective operating configurations wherein the tools are oriented towards the wheel mounted on the wheel-holder unit for being positioned in a working position in contact with the tyre by translation of the upper operating head;
- a first operating configuration wherein the upper bead breaker disc is selected, a second operating configuration wherein the removal tool is selected, a third operating configuration wherein the fitting tool and the wall pressing tool are selected.

9. The machine according to claim 8, comprising:
- a first three-stage actuator operatively connected to the upper operating head for rotating it between the above-mentioned operating configurations, wherein the first actuator defines a first stage in which it positions the upper operating head in the first operating configuration, a second stage in which it positions the upper operating head in the second operating configuration, a third stage in which it positions the upper operating head in a third operating configuration, thereby defining a predetermined sequence of operating positions as a function of a predetermined direction of rotation of the upper operating head;
- a control unit connected to the first actuator for controlling a movement from one stage to the other, according to the following predetermined sequence of stages: first stage, second stage, third stage, wherein the passage from the first stage to the second stage and the passage from the second stage to the third stage correspond to a rotation of the upper operating head according to the predetermined direction of rotation and the passage from the third stage to the first stage corresponds to a rotation of the upper operating head in an opposite direction to the predetermined direction of rotation.

10. The machine according to claim 1, wherein the upper operating head defines radial grooves housing respective base portions of the upper fitting tool and at least one further tool.

11. The machine according to claim 1, wherein the lower operating head comprises at least two lower tools angularly spaced by predetermined angles for being selectively and alternatively positionable in respective operating positions for rotating the lower operating head.

12. The machine according to claim 11, wherein the lower tools comprise a lower bead breaker disc and a lower fitting tool.

* * * * *